Dec. 14, 1948.                L. A. BELL                    2,456,484
                              GLARE SCREEN
                          Filed Sept. 23, 1946
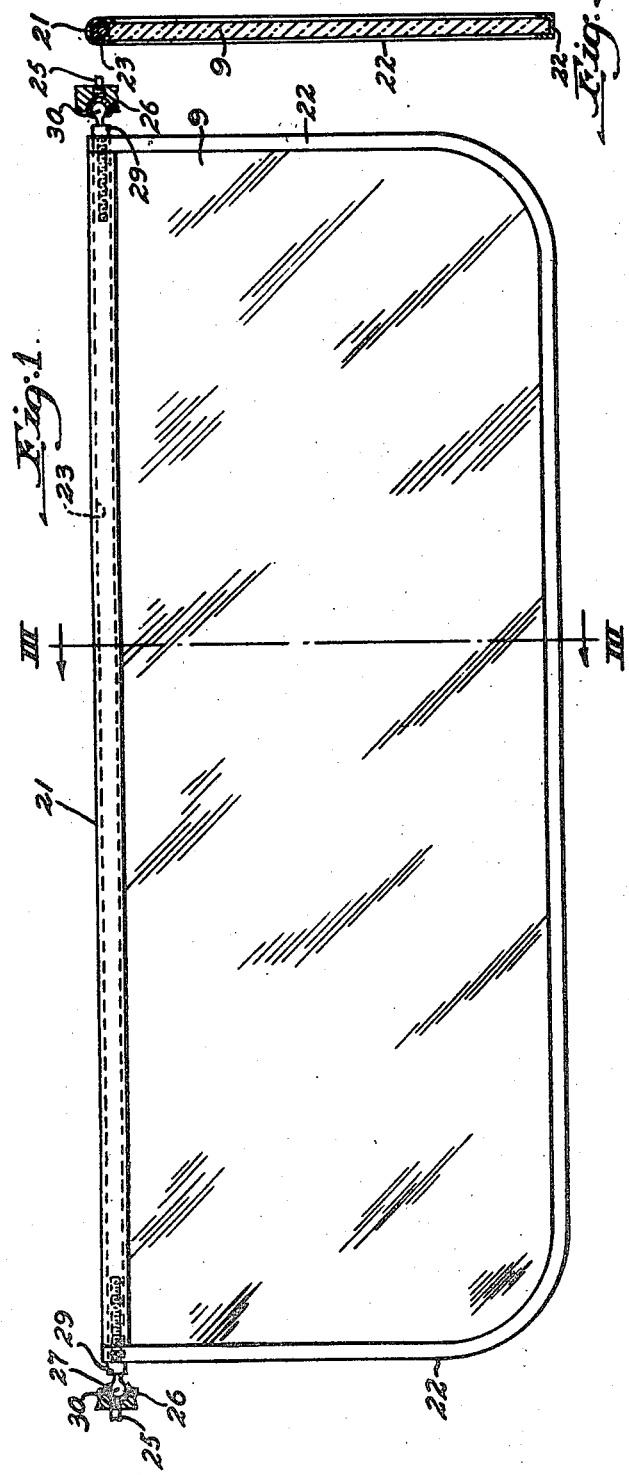
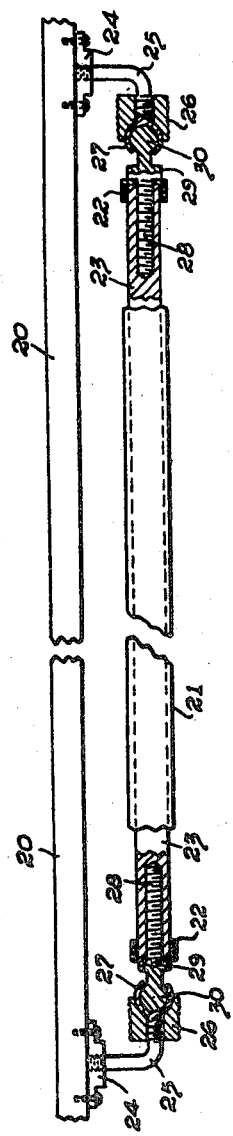
INVENTOR
LEE ALEXANDER BELL.
BY Archworth Martin
his ATTORNEY.

Patented Dec. 14, 1948

2,456,484

UNITED STATES PATENT OFFICE 2,456,484

GLARE SCREEN

Lee Alexander Bell, Valencia, Pa.

Application September 23, 1946, Serial No. 698,626

2 Claims. (Cl. 296—97)

My invention relates to glare screens that are placed in the line of vision between the user and a bright light, for the purpose of eliminating or reducing glare, and is here shown as employed in connection with an automobile windshield for the purpose of relieving the driver's eyes from the glare of on-coming head lights or bright sunlight.

The invention has for its object the provision of an improved form of mounting for semi-transparent glass or the like which can readily be moved to adjusted positions behind a windshield, into and out of the driver's line of vision.

Figure 1 is a face view of a glare screen embodying my invention; Fig. 2 is a sectional plan view thereof, showing the manner in which it is mounted on the frame or body of an automobile, and Fig. 3 is a view taken on the line III—III of Fig. 1.

The glare shield contains a plate or sheet 9 of glass or other semi-transparent material. In each instance, I prefer that the member 9 be formed of tinted glass plates tightly adherent to an intermediate flexible film, after the manner of ordinary "non-shatterable" glass. The glass sheets may be tinted green or some other suitable color, and the over-all thickness of each composite element 9 need not be more than one-eighth inch.

The screen structure may be mounted on a suitable support such as a wood board 20 frequently positioned above the wind shield of a motor car, and comprises frame members 21 and 22 of channel form, for the glass 9. A rod 23 fits in the upper part of the channel 21, and is connected to the board 20 by bracket plates 24 and bracket arms 25. Nuts 26 are threaded on the arms 25 and partly embrace split sockets on the bracket 27. In this case, the frame members 21 and 22 correspond to the frame members 14 and 15, but the rod 23 that supports the frame member 21 differs somewhat from the rod 10. Bracket plates 24 are secured to the board 20 and have threaded engagement with bracket arms 25 whose outer ends have threaded engagement with knurled clamping nuts 26 and are also provided with split socket end portions 27.

After a glass has been inserted in the frame members 21—22, with the member 21 in assembled relation on the rod 23, screws 28 are turned tightly into place in tapped holes in the rod 23, they being provided with wrench-engaging shoulders 29 for this purpose, which shoulders will also abut against the frame member 22. Balls 30 that are formed on the ends of the screws 28 are snapped into place in the sockets 27, whereupon the nuts 26 will be turned to produce the required frictional engagement between the ball 30 and the sockets 27. By reason of the screw-threaded connections between the bracket arms 25 and their respective plates 24, it will be seen that the nuts 26 can be readily assembled on the bracket arms before the plates 24 are connected to the arms.

I claim as my invention:

1. A glare screen comprising a rod, a frame member of split sleeve form partly embracing the rod, and having its longitudinal edges spaced apart to receive an edge of a glass plate between them, a frame member of yoke-like form having a channel to receive the other edges of the glass, screws extending through the yoke adjacent to its ends and into axially-extending tapped holes in the ends of the rod, the screws having ball-shaped heads, bracket arms having yieldable sockets partially embracing the ball heads, and clamping nuts screw-threaded on the arms and movable to contract the sockets on the ball heads, to thereby hold the frame against idle tilting movements relative to the brackets.

2. A glare screen comprising a rod, a frame member of split sleeve form partly embracing the rod, and having its longitudinal edges spaced apart to receive the edge of a glass plate between them, a frame member of yoke-like form having a channel to receive the other edges of the glass, screws extending through the yoke adjacent to its ends and into axially-extending tapped holes in the ends of the rod, the screws having shoulders for holding the ends of the yoke frame member in clamping engagement with the adjacent ends of the rod and the split sleeve, and having ball-shaped heads, bracket arms having yieldable sockets partially embracing the ball heads, and clamping nuts screw-threaded on the arms and movable to contract the sockets on the ball heads, to thereby hold the frame against idle tilting movements relative to the brackets.

LEE ALEXANDER BELL.

REFERENCES CITED

The following references are of record in the file of this patent:

UNITED STATES PATENTS

| Number | Name | Date |
|---|---|---|
| 947,751 | Long et al. | Jan. 25, 1910 |
| 1,403,620 | Parker | Jan. 17, 1922 |
| 2,207,668 | Hudgins | July 9, 1940 |